US011921489B2

(12) United States Patent
Nakajima (10) Patent No.: US 11,921,489 B2
(45) Date of Patent: Mar. 5, 2024

(54) NUMERICAL CONTROL DEVICE, LEARNING APPARATUS, INFERENCE APPARATUS, AND NUMERICAL CONTROL METHOD (71) Applicant: Mitsubishi Electric Corporation, Tokyo (JP)

(72) Inventor: Kazuya Nakajima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/039,970

(22) PCT Filed: Jun. 2, 2021

(86) PCT No.: PCT/JP2021/021045
§ 371 (c)(1),
(2) Date: Jun. 2, 2023

(87) PCT Pub. No.: WO2022/254621
PCT Pub. Date: Dec. 8, 2022

(65) Prior Publication Data
US 2023/0393551 A1 Dec. 7, 2023

(51) Int. Cl.
*G05B 19/4093* (2006.01)
(52) U.S. Cl.
CPC .......... *G05B 19/4093* (2013.01); *G05B 2219/34082* (2013.01); *G05B 2219/37435* (2013.01)
(58) Field of Classification Search
None
See application file for complete search history.

(56) References Cited

U.S. PATENT DOCUMENTS

| 9,886,022 | B2 | 2/2018 | Watanabe et al. |
| 9,910,421 | B2 | 3/2018 | Kameta et al. |
| 10,509,387 | B2 | 12/2019 | Yamamoto |
| 11,106,194 | B2 * | 8/2021 | Miyake .............. G05B 19/4103 |
| 11,253,924 | B2 | 2/2022 | Kitakaze et al. |
| 11,474,497 | B2 | 10/2022 | Sagasaki |

(Continued)

FOREIGN PATENT DOCUMENTS

| CN | 112589214 A | 4/2021 |
| JP | 2000-214909 A | 8/2000 |

(Continued)

OTHER PUBLICATIONS

International Search Report and Written Opinion dated Aug. 10, 2021, received for PCT Application PCT/JP2021/021045, filed on Jun. 2, 2021, 9 pages including English Translation.

(Continued)

*Primary Examiner* — Ryan A Jarrett
(74) *Attorney, Agent, or Firm* — XSENSUS LLP (57) ABSTRACT

A numerical control device for machining a workpiece while performing vibration cutting in which a tool and the workpiece are relatively vibrated by driving a first axis that drives the tool or a second axis that drives the workpiece, includes a parameter adjustment unit that adjust a parameter related to a vibration condition for the vibration cutting, based on the amount of cutting load generated on the first axis or the second axis when the vibration cutting is performed, and a controller that controls the vibration cutting using the adjusted parameter.

13 Claims, 8 Drawing Sheets

(56) References Cited

U.S. PATENT DOCUMENTS

| | | | |
|---|---|---|---|
| 2010/0292822 A1* | 11/2010 | Hahn | ............... G05B 19/40937 |
| | | | 700/98 |
| 2016/0266567 A1 | 9/2016 | Watanabe et al. | |
| 2020/0101538 A1* | 4/2020 | Kitakaze | ............... B23B 29/125 |

FOREIGN PATENT DOCUMENTS

| | | | |
|---|---|---|---|
| JP | 2006-334732 | A | 12/2006 |
| JP | 5745710 | B1 | 7/2015 |
| JP | 2017-056515 | A | 3/2017 |
| JP | 2018-147030 | A | 9/2018 |
| JP | 2019-028597 | A | 2/2019 |
| JP | 2019-166604 | A | 10/2019 |
| JP | 6811908 | B1 | 1/2021 |
| WO | 2018/181447 | A1 | 10/2018 |
| WO | 2020261581 | A1 | 12/2020 |

OTHER PUBLICATIONS

Notice of Reasons for Refusal dated Jun. 21, 2022, received for JP Application 2021-562177, 6 pages including English Translation.
Decision to Grant dated Sep. 13, 2022, received for JP Application 2021-562177, 3 pages including English Translation.
Chinese Office Action dated Jan. 8, 2024 in corresponding Chinese Patent Application No. 202180087230.4, 13 pages.

* cited by examiner

NUMERICAL CONTROL DEVICE, LEARNING APPARATUS, INFERENCE APPARATUS, AND NUMERICAL CONTROL METHOD

CROSS-REFERENCE TO RELATED APPLICATION

The present application is based on PCT filing PCT/JP2021/021045, filed Jun. 2, 2021, the entire contents of which are incorporated herein by reference.

FIELD

The present disclosure relates to a numerical control device for controlling vibration cutting, a learning apparatus, an inference apparatus, and a numerical control method.

BACKGROUND

Numerical control devices control machine tools that cut a workpiece being rotated with a tool. One of the machine tools is a machine that performs vibration cutting, which is cutting with a tool being vibrated at a low frequency. When vibration cutting is properly performed, air-cutting zones where cutting is not performed are produced between the movement path of the tool and a workpiece. By providing the air-cutting zones, the machine tool shortens chips generated by cutting to allow the chips to fall off the workpiece.

A numerical control device of Patent Literature 1 calculates a time delay of a vibration backward position with respect to a vibration forward position as a phase difference, based on a ratio between the amplitude of vibration and a tool feed rate with respect to a workpiece. The numerical control device of Patent Literature 1 calculates a movement path based on the calculated phase difference, calculates a vibration movement amount based on a reference vibration waveform, and performs vibration cutting using the movement path and the vibration movement amount.

CITATION LIST

Patent Literature

Patent Literature 1: Japanese Patent No. 5745710

SUMMARY

Technical Problem

However, in the technique of Patent Literature 1, if chips cannot be cut off due to the occurrence of a following delay of a servomotor or the like, a user of the numerical control device needs to adjust a parameter used in vibration cutting.

The present disclosure has been made in view of the above, and an object thereof is to provide a numerical control device that can continue vibration cutting control without a user performing parameter adjustment.

Solution to Problem

To solve the problem described above and achieve the object, the present disclosure is a numerical control device to machine a workpiece while performing vibration cutting in which a tool and the workpiece are relatively vibrated by driving a first axis to drive the tool or a second axis to drive the workpiece, that comprises: a parameter adjustment unit to adjust a parameter related to a vibration condition for the vibration cutting, based on an amount of cutting load generated on the first axis or the second axis when the vibration cutting is performed; and a controller to control the vibration cutting using the adjusted parameter.

Advantageous Effects of Invention

The numerical control device according to the present disclosure has the effect of being able to continue vibration cutting control without a user performing parameter adjustment.

DESCRIPTION OF EMBODIMENTS

Hereinafter, a numerical control device, a learning apparatus, an inference apparatus, and a numerical control method according to embodiments of the present disclosure will be described in detail with reference to the drawings.

Embodiment

Figure 1:
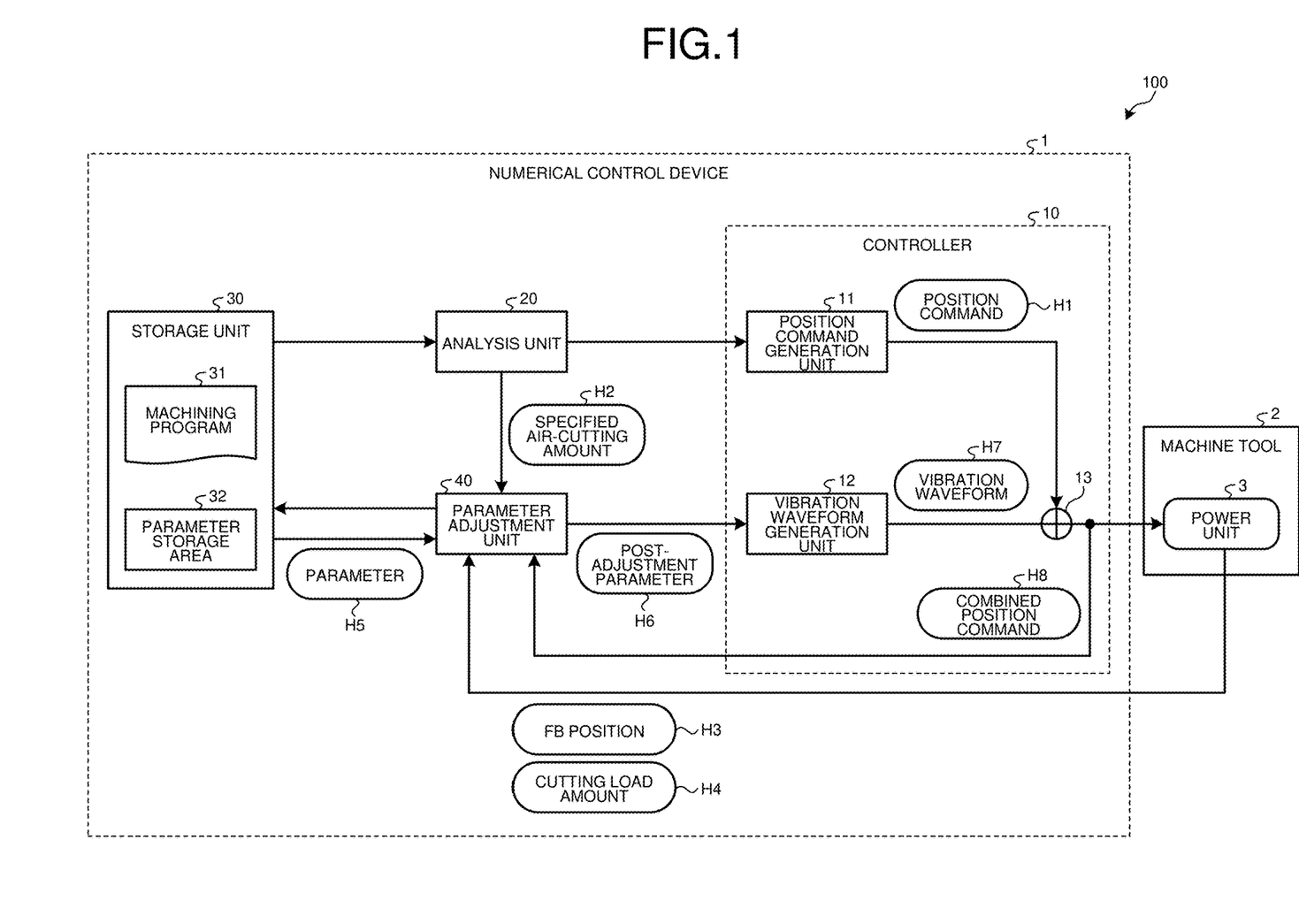
FIG. 1 is a diagram illustrating a configuration of a machining system including a numerical control device according to an embodiment.

FIG. 1 is a diagram illustrating a configuration of a machining system including a numerical control device according to an embodiment. A machining system 100 includes a numerical control device 1 and a machine tool 2. The machine tool 2 is a machine that performs vibration cutting (low-frequency vibration cutting) with a tool on an object to be machined, for example, a cylindrical workpiece. The machine tool 2 includes a power unit 3 that is a unit to drive the tool and the workpiece.

The machine tool 2 rotates the workpiece with a principal axis that is the cylindrical axis of the workpiece as a rotation axis, and brings the tool into contact with the workpiece to machine the workpiece. The machine tool 2 vibrates the tool in directions parallel to the rotation axis and moves the tool such that the tool advances in a direction parallel to the rotation axis while machining the workpiece.

The numerical control device 1 is a computer that performs numerical control (NC) on the machine tool 2. The numerical control device 1 automatically adjusts a parameter related to a vibration condition (hereinafter, referred to as a parameter H5) and a post-adjustment parameter H6 to be described later that are used when the machine tool 2 is made to perform vibration cutting.

The numerical control device 1 includes a controller 10, an analysis unit 20, a storage unit 30, and a parameter adjustment unit 40. The controller 10 includes a position command generation unit 11, a vibration waveform generation unit 12, and an adder 13.

The storage unit 30 includes a parameter storage area 32 that stores the parameter H5 and the post-adjustment parameter H6 used when the machine tool 2 is made to perform vibration cutting. An example of the parameter H5 and the post-adjustment parameter H6 is a vibration amplitude-feed ratio. The vibration amplitude-feed ratio is the ratio between the amplitude amount of tool vibration and a tool feed rate. The tool feed rate is the movement rate of the tool in a direction parallel to the principal axis. The tool feed rate does not include rate changes due to vibration of the tool. In the following description, the vibration amplitude-feed ratio is referred to as a vibration amplitude-feed ratio Q1. The amplitude amount has the relationship $A3=Q1 \times F$, where A3 is the amplitude amount of tool vibration, and F is the tool feed rate.

The storage unit 30 stores a machining program 31 used when the numerical control device 1 controls the machine tool 2. The machining program 31 includes information on an air-cutting amount during vibration cutting specified by a user (hereinafter, referred to as a specified air-cutting amount H2), information on the tool feed rate F, etc. The air-cutting amount is the amplitude-direction length of air-cutting zones where cutting is not performed between the movement path of the tool and the workpiece. The specified air-cutting amount H2 is a command value of the air-cutting amount when the tool cuts air with respect to the workpiece during vibration cutting. The specified air-cutting amount H2 may be stored in the storage unit 30.

The analysis unit 20 reads the machining program 31 from the storage unit 30. The analysis unit 20 analyzes the machining program 31 and sends the analysis results to the position command generation unit 11 of the controller 10. At the time of analysis processing on the machining program 31, the analysis unit 20 calculates, for example, the amplitude amount A3 of tool vibration based on the relationship $A3=Q1 \times F$ described above. The analysis unit 20 sends the analysis results including information on the amplitude amount A3 to the position command generation unit 11. The analysis unit 20 sends the specified air-cutting amount H2 included in the machining program 31 to the parameter adjustment unit 40.

The parameter adjustment unit 40 adjusts the parameter H5 using artificial intelligence (AI). The parameter adjustment unit 40 receives the specified air-cutting amount H2 from the analysis unit 20. The parameter adjustment unit 40 receives the parameter H5 from the storage unit 30. The parameter adjustment unit 40 receives a feedback (FB) position H3 and a cutting load amount H4 from the power unit 3.

The FB position H3 is information indicating the actual position of the tool during vibration cutting. The FB position H3 includes information on the feed axis position of the tool and information on a principal axis rotation angle. The feed axis position of the tool is the position of the tool in the direction parallel to the principal axis. At the time of vibration cutting, the tool is moved forward in the direction parallel to the principal axis as the rotation axis of the workpiece while being vibrated in the directions parallel to the principal axis. The position of the tool at this time is the feed axis position of the tool. The principal axis rotation angle is the rotation angle of the principal axis. In vibration cutting, the tool vibrates (0.5+N) times per rotation (360 degrees) of the principal axis, where N is a natural number. In the present embodiment, a case where N=1 will be described.

The cutting load amount H4 is the amount of load generated when an axis for driving the tool (first axis) or an axis for driving the workpiece (second axis) is driven to vibration-cut the workpiece with the tool. Vibration cutting provides air-cutting zones where cutting is not performed between the movement path of the tool and the workpiece, allowing chips to be cut off. In the air-cutting zones, the load statuses of the axis driving the tool and the axis driving the workpiece become lower than those when the tool is in contact with the workpiece. In the present embodiment, by using this, the numerical control device 1 learns the periodic load statuses of the axes, automatically adjusts the parameter H5 during vibration cutting, and performs vibration cutting control such that chips can be cut off even when a following delay of a servomotor or the like occurs.

For the numerical control device 1, the specified air-cutting amount H2 is set which is a value input by the user. The numerical control device 1 performs vibration cutting control while automatically adjusting the post-adjustment parameter H6 so that an actual air-cutting amount (an estimated air-cutting amount H9 to be described later) becomes the specified air-cutting amount H2, based on the period in which the cutting load amount H4 is low, the principal axis rotation angle, and the feed axis position.

The parameter adjustment unit 40 includes a learning apparatus 60 and an inference apparatus 70 to be described later. The parameter adjustment unit 40 machine-learns a parameter appropriate for the specified air-cutting amount H2, using the specified air-cutting amount H2, the parameter H5, the FB position H3, the cutting load amount H4, and a combined position command H8 to be described later. The parameter appropriate for the specified air-cutting amount H2 is a parameter obtained by adjusting the parameter H5 (hereinafter, referred to as the post-adjustment parameter H6). After machine-learning the post-adjustment parameter H6, the parameter adjustment unit performs machine learning using the post-adjustment parameter H6 instead of the parameter H5. Thus, the parameter adjustment unit 40 machine-learns a new post-adjustment parameter H6 appropriate for a new specified air-cutting amount H2.

The parameter adjustment unit 40 performs machine learning on the post-adjustment parameter H6, based on the parameter H5 or the post-adjustment parameter H6. The following describes a case where the parameter adjustment unit 40 performs machine learning on the post-adjustment parameter H6 using the post-adjustment parameter H6.

The parameter adjustment unit 40 determines an air-cutting period based on the cutting load amount H4, and calculates an estimated air-cutting amount (the estimated air-cutting amount H9) that is an estimated value of the air-cutting amount, based on the FB position H3 and the combined position command H8. The parameter adjustment unit 40 performs machine learning based on the estimated air-cutting amount H9, the specified air-cutting amount H2, and the post-adjustment parameter H6. The parameter adjustment unit 40 machine-learns the post-adjustment parameter H6 so that the estimated air-cutting amount H9 estimated to be the actual air-cutting amount approaches the specified air-cutting amount H2.

During vibration cutting, the parameter adjustment unit 40 infers the post-adjustment parameter H6 appropriate for the specified air-cutting amount H2, based on the specified air-cutting amount H2 and the estimated air-cutting amount H9. The parameter adjustment unit 40 sends the inferred post-adjustment parameter H6 to the vibration waveform generation unit 12 of the controller 10.

The position command generation unit 11 generates a position command (hereinafter, referred to as a position command H1) to the tool, based on the results of the analysis of the machining program 31. The position command generation unit 11 sends the position command H1 to the adder 13.

The vibration waveform generation unit 12 generates a vibration waveform of the tool (hereinafter, referred to as a vibration waveform H7) based on the post-adjustment parameter H6. The vibration waveform generation unit 12 sends the vibration waveform H7 to the adder 13. The adder 13 adds the vibration waveform H7 to the position command H1 to generate a combined position command (hereinafter, referred to as the combined position command H8) that is a position command including a vibration component of the tool. The adder 13 sends the combined position command H8 to the power unit 3. The adder 13 also sends the combined position command H8 to the parameter adjustment unit 40.

The power unit 3 controls the position of the tool according to the combined position command H8. The power unit 3 includes a servo controller, a servomotor, a spindle controller, and a spindle motor. The servomotor is a motor for moving the tool. The servo controller controls the servomotor. The spindle motor is a motor for rotating the principal axis as the rotation axis of the workpiece. The spindle controller controls the spindle motor. The power unit 3 causes the tool and the workpiece to move, using the servo controller, the servomotor, the spindle controller, and the spindle motor, to perform vibration cutting. Rotation control on the workpiece may be performed by the controller 10 or another controller.

At the time of vibration cutting, the machine tool 2 detects the FB position H3 and the cutting load amount H4 and sends them to the parameter adjustment unit 40. The cutting load amount H4 may be a load current value that is a current value corresponding to load, or may be a value detected by a sensor. When the cutting load amount H4 is detected as a sensor value, for example, a sensor such as a torque sensor may be disposed in the machine tool 2.

Figure 2:
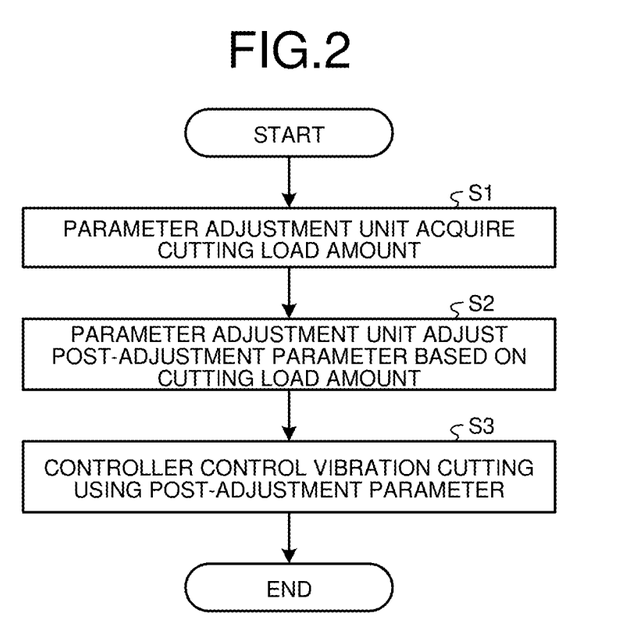
FIG. 2 is a flowchart illustrating a processing procedure for control processing by the numerical control device according to the embodiment.

FIG. 2 is a flowchart illustrating a processing procedure for control processing by the numerical control device according to the embodiment. When the numerical control device 1 starts vibration cutting, the parameter adjustment unit 40 acquires the cutting load amount H4 (step S1). The parameter adjustment unit 40 adjusts the post-adjustment parameter H6 based on the cutting load amount H4 (step S2). The controller 10 controls the vibration cutting using the post-adjustment parameter H6 (step S3).

Next, learning processing and inference processing by the numerical control device 1 will be described. The parameter adjustment unit 40 of the numerical control device 1 includes the learning apparatus 60 and the inference apparatus 70. The learning apparatus 60 may be an apparatus configured separately from the numerical control device 1 and disposed outside the numerical control device 1. The inference apparatus 70 may be an apparatus configured separately from the numerical control device 1 and disposed outside the numerical control device 1.

<Learning Phase>

Figure 3:
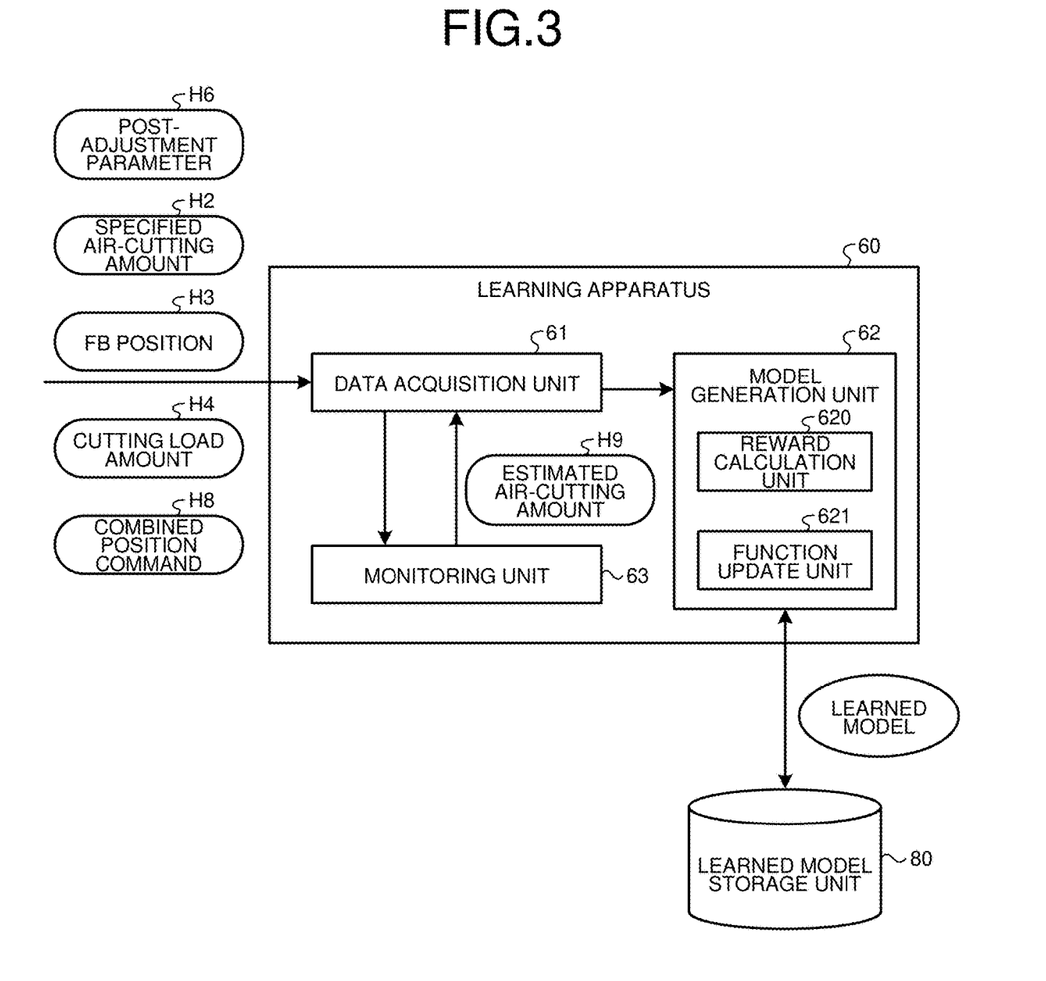
FIG. 3 is a diagram illustrating a configuration of a learning apparatus included in the numerical control device according to the embodiment.

FIG. 3 is a diagram illustrating a configuration of the learning apparatus included in the numerical control device according to the embodiment. The learning apparatus 60 includes a data acquisition unit 61, a monitoring unit 63, and a model generation unit 62.

The data acquisition unit 61 receives information in which the post-adjustment parameter H6 such as the vibration amplitude-feed ratio Q1, the specified air-cutting amount H2, the FB position H3, the cutting load amount H4, and the combined position command H8 are associated with one another.

The data acquisition unit 61 sends the FB position H3, the cutting load amount H4, and the combined position command H8 to the monitoring unit 63. The data acquisition unit 61 receives, from the monitoring unit 63, the estimated air-cutting amount H9 corresponding to the FB position H3, the cutting load amount H4, and the combined position command H8.

The post-adjustment parameter H6, the specified air-cutting amount H2, and the estimated air-cutting amount H9 acquired by the data acquisition unit 61 are training data. The data acquisition unit 61 sends the training data to the model generation unit 62. Until the post-adjustment parameter H6 is calculated, the parameter H5 is sent to the data acquisition unit 61 instead of the post-adjustment parameter H6.

The monitoring unit 63 acquires the FB position H3, the cutting load amount H4, and the combined position command H8 from the data acquisition unit 61, monitors vibration cutting, and estimates the estimated air-cutting amount H9. The monitoring unit 63 sends the estimated air-cutting amount H9 to the data acquisition unit 61. The data acquisition unit 61 associates the estimated air-cutting amount H9, the post-adjustment parameter H6, and the specified air-cutting amount H2 with one another, and sends them as training data to the model generation unit 62.

Figure 4:
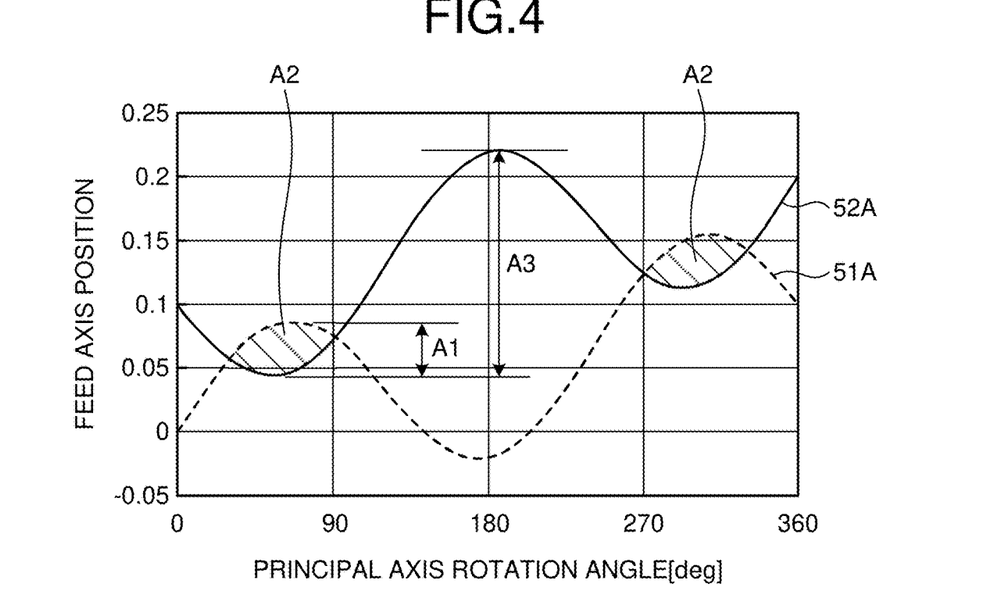
FIG. 4 is a diagram for explaining an amplitude amount and an estimated air-cutting amount calculated by the learning apparatus according to the embodiment.
Figure 5:
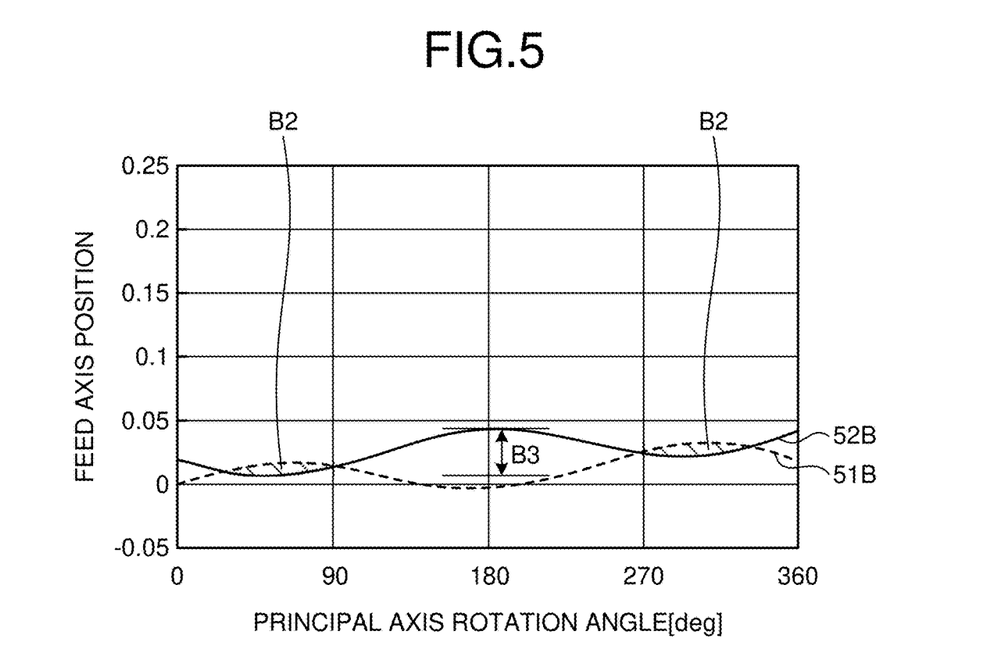
FIG. 5 is a diagram for explaining an amplitude amount and an estimated air-cutting amount calculated by the learning apparatus according to the embodiment when a tool feed rate is low.

Here, the amplitude amount A3 and the estimated air-cutting amount H9 will be described. FIG. 4 is a diagram for explaining the amplitude amount and the estimated air-cutting amount calculated by the learning apparatus according to the embodiment. In graphs illustrated in FIG. 4 and FIG. 5 to be described later, the horizontal axis represents the principal axis rotation angle, and the vertical axis represents the feed axis position. FIGS. 4 and 5 illustrate waveforms 51A, 52A, 51B, and 52B of the tool position during vibration cutting, that is, the feed axis position with respect to the principal axis rotation angle.

In vibration cutting, the tool is moved forward in the direction parallel to the principal axis while vibrating in the directions parallel to the principal axis. The waveform 51A is a waveform indicating the feed axis position of the tool in the first rotation of the workpiece. The waveform 52A is a waveform indicating the feed axis position of the tool in the second rotation of the workpiece. Zones below the waveform 51A and above the waveform 52A are air-cutting zones A2. When an air-cutting period that is a period of each air-cutting zone A2 is started, a chip is cut off.

The monitoring unit 63 calculates the waveforms 51A and 52A based on the FB position H3 and the combined position command H8. The amplitude amount A3 in the waveform 52A is the amplitude amount A3 calculated by the analysis unit 20 based on the tool feed rate F and the vibration amplitude-feed ratio Q1.

The monitoring unit 63 determines the air-cutting period of the air-cutting zones A2 based on the cutting load amount H4. The monitoring unit 63 calculates the estimated air-cutting amount H9 based on the waveforms 51A and 52A in the air-cutting period. In FIG. 4, the estimated air-cutting amount H9 is indicated by an air-cutting amount A1. The monitoring unit 63 calculates an air-cutting amount of the greatest value of air-cutting amounts at the FB positions H3 within the air-cutting period as the air-cutting amount A1 (estimated air-cutting amount H9).

FIG. 5 is a diagram for explaining the amplitude amount and the estimated air-cutting amount calculated by the learning apparatus according to the embodiment when the tool feed rate is low. The waveform 51B is a waveform indicating the feed axis position of the tool in the first rotation of the workpiece. The waveform 52B is a waveform indicating the feed axis position of the tool in the second rotation of the workpiece. Zones below the waveform 51B and above the waveform 52B are air-cutting zones B2. In FIG. 5, the amplitude amount calculated by the monitoring unit 63 is indicated by an amplitude amount B3.

As illustrated in FIG. 5, when the tool feed rate F is low, the air-cutting zones B2 become smaller even with the amplitude amount B3 at which chips fall off. In this case, a factor such as the viscosity of the workpiece may prevent chips from falling off. Even in this case, in the present embodiment, the monitoring unit 63, which determines the air-cutting period of the air-cutting zones B2 based on the cutting load amount H4, can thus accurately determine whether or not the air-cutting zones B2 where chips fall off are produced. Consequently, when the air-cutting zones B2 where chips fall off are not produced, the numerical control device 1 can produce the air-cutting zones B2 where chips fall off by adjusting the post-adjustment parameter H6.

Figure 6:
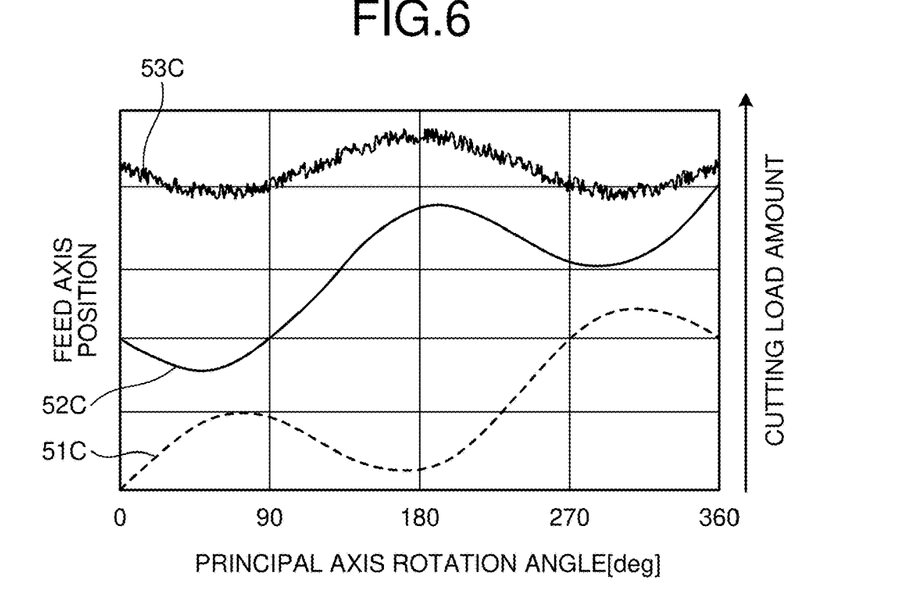
FIG. 6 is a diagram for explaining a cutting load amount when the learning apparatus according to the embodiment does not detect air-cutting zones.
Figure 7:
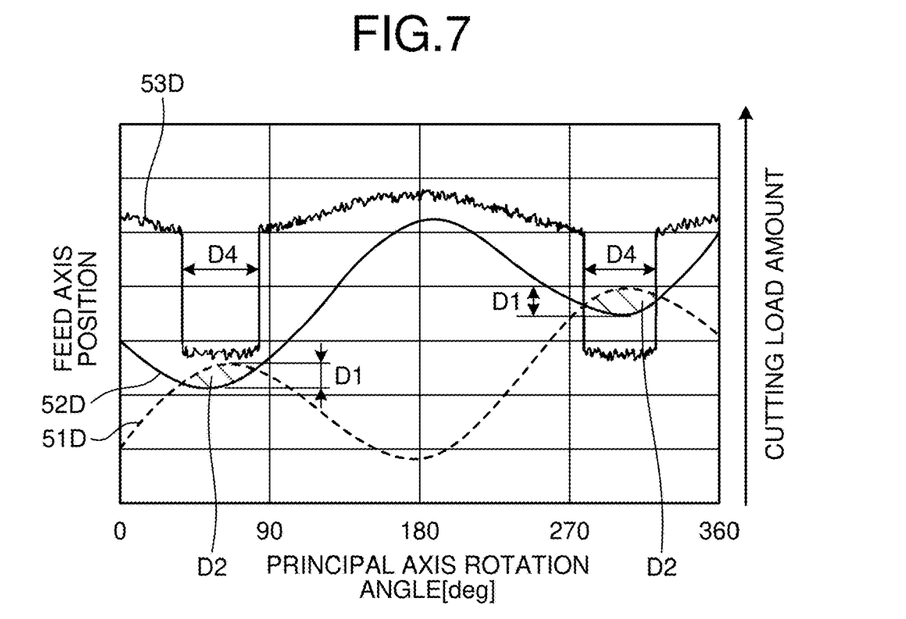
FIG. 7 is a diagram for explaining a cutting load amount when the learning apparatus according to the embodiment detects air-cutting zones.

Here, the relationship between the cutting load amount H4 and air-cutting zones will be described. FIG. 6 is a diagram for explaining the cutting load amount when the learning apparatus according to the embodiment does not detect air-cutting zones. FIG. 7 is a diagram for explaining the cutting load amount when the learning apparatus according to the embodiment detects air-cutting zones.

In graphs illustrated in FIGS. 6 and 7, the horizontal axis represents the principal axis rotation angle, and the vertical axis represents the feed axis position and the cutting load amount. FIGS. 6 and 7 illustrate the feed axis position with respect to the principal axis rotation angle, and the cutting load amount H4 with respect to the principal axis rotation angle.

In FIG. 6, a waveform 51C is a waveform indicating the feed axis position of the tool in the first rotation of the workpiece, and a waveform 52C is a waveform indicating the feed axis position of the tool in the second rotation of the workpiece. In FIG. 6, a waveform of the cutting load amount H4 with respect to the waveform 52C is indicated by a cutting load amount waveform 53C.

If there are zones below the waveform 51C and above the waveform 52C, these zones are air-cutting zones, but there are no air-cutting zones in FIG. 6.

Consequently, chips are not cut off. The cutting load amount waveform 53C in this case changes slowly according to the waveform 52C.

In FIG. 7, a waveform 51D is a waveform indicating the feed axis position of the tool in the first rotation of the workpiece, and a waveform 52D is a waveform indicating the feed axis position of the tool in the second rotation of the workpiece. In FIG. 7, a waveform of the cutting load amount H4 with respect to the waveform 52D is indicated by a cutting load amount waveform 53D.

Zones below the waveform 51D and above the waveform 52D are air-cutting zones D2. The cutting load amount waveform 53D changes slowly according to the waveform 52D. However, in an air-cutting period D4 of each air-cutting zone D2, the cutting load amount waveform 53D drops significantly since the tool does not come into contact with the workpiece.

The monitoring unit 63 determines the air-cutting period D4 based on a change in the cutting load amount waveform 53D. Then, the monitoring unit 63 calculates an air-cutting amount D1 in the air-cutting period D4, and sends the estimated air-cutting amount H9 that is the air-cutting amount D1 to the model generation unit 62 via the data acquisition unit 61.

The model generation unit 62 learns mainly the post-adjustment parameter H6 such as the vibration amplitude-feed ratio Q1, based on the training data including the post-adjustment parameter H6, the specified air-cutting amount H2, and the estimated air-cutting amount H9.

As a learning algorithm used by the model generation unit 62, a known algorithm such as supervised learning, unsupervised learning, or reinforcement learning can be used. As an example, a case where the model generation unit 62 applies reinforcement learning to the learning algorithm will be described. In reinforcement learning, an agent in a certain environment observes a current state (environmental parameters) and determines an action to take. The agent's action dynamically changes the environment. The agent is given a reward according to the change in the environment. The agent repeats this and learns an action policy that obtains the most reward through a series of actions. As typical methods of reinforcement learning, Q-learning and TD-learning are known. For example, in Q-learning, a typical update equation of the action-value function Q(s, a) is represented by formula (1) below.

Formula 1

$$Q(s_t, a_t) \leftarrow Q(s_t, a_t) + \alpha\left(r_{t+1} + \gamma\max_a Q(s_{t+1}, a) - Q(s_t, a_t)\right) \quad (1)$$

In formula (1), $s_t$ represents an environmental state at a time t, and at represents an action at the time t. The action $a_t$ changes the state to $s_{t+1}$. $r_{t+1}$ represents a reward given due to the change in state, γ represents a discount factor, and α represents a learning rate. γ is in the range of 0<γ≤1. α is in the range of 0<α≤1. The post-adjustment parameter H6 is the action $a_t$. The specified air-cutting amount H2 and the estimated air-cutting amount H9 are the state $s_t$. The best action $a_t$ in the state $s_t$ at the time t is learned.

In the update equation represented by formula (1), if the action value Q of an action a of the highest Q value at a time t+1 is greater than the action value Q of an action a performed at the time t, the action value Q is increased. In the opposite case, the action value Q is reduced. In other words, in the update equation represented by formula (1), the action-value function Q(s, a) is updated such that the action value Q of the action a at the time t approaches the best action value at the time t+1. Thus, the best action value in a certain environment is sequentially propagated to the action values in the previous environments.

As described above, when a learned model is generated by reinforcement learning, the model generation unit 62 includes a reward calculation unit 620 and a function update unit 621.

The reward calculation unit 620 calculates a reward based on the specified air-cutting amount H2 and the estimated air-cutting amount H9. The reward calculation unit 620 calculates a reward r based on an air-cutting amount difference that is the difference between the specified air-cutting amount H2 and the estimated air-cutting amount H9.

For example, the reward calculation unit 620 increases the reward r (for example, gives a reward of "1") when the air-cutting amount difference between the specified air-cutting amount H2 and the estimated air-cutting amount H9 decreases, and on the other hand, reduces the reward r (for example, gives a reward of "−1") when the air-cutting amount difference increases.

The reward calculation unit 620 may calculate a reward based on the estimated air-cutting amount H9. In this case, the data acquisition unit 61 may not acquire the specified air-cutting amount H2.

In a case where the specified air-cutting amount H2 is not set, the reward calculation unit 620 increases the reward r (for example, gives a reward of "1") when the estimated air-cutting amount H9 decreases and is greater than zero (there are periodic load changes), and on the other hand, decreases the reward r (for example, gives a reward of "−1") when the estimated air-cutting amount H9 increases or is zero (there are no periodic load changes). In this manner, the reward calculation unit 620 changes reward criteria depending on the presence or absence of the specified air-cutting amount H2.

The function update unit 621 updates a function for determining the post-adjustment parameter H6, according to the reward calculated by the reward calculation unit 620, and outputs the updated function as the learned model to the learned model storage unit 80. For example, in Q-learning, the function update unit 621 uses the action-value function $Q(s_t, a_t)$ represented by formula (1) as the function for calculating the post-adjustment parameter H6.

The model generation unit 62 repeatedly performs the learning as described above. The learned model storage unit 80 stores the action-value function $Q(s_t, a_t)$ updated by the function update unit 621, that is, the learned model. The learned model storage unit 80 may be disposed in the learning apparatus 60 or outside the learning apparatus 60. Also, the learned model storage unit 80 may be disposed in the numerical control device 1 or outside the numerical control device 1.

Figure 8:
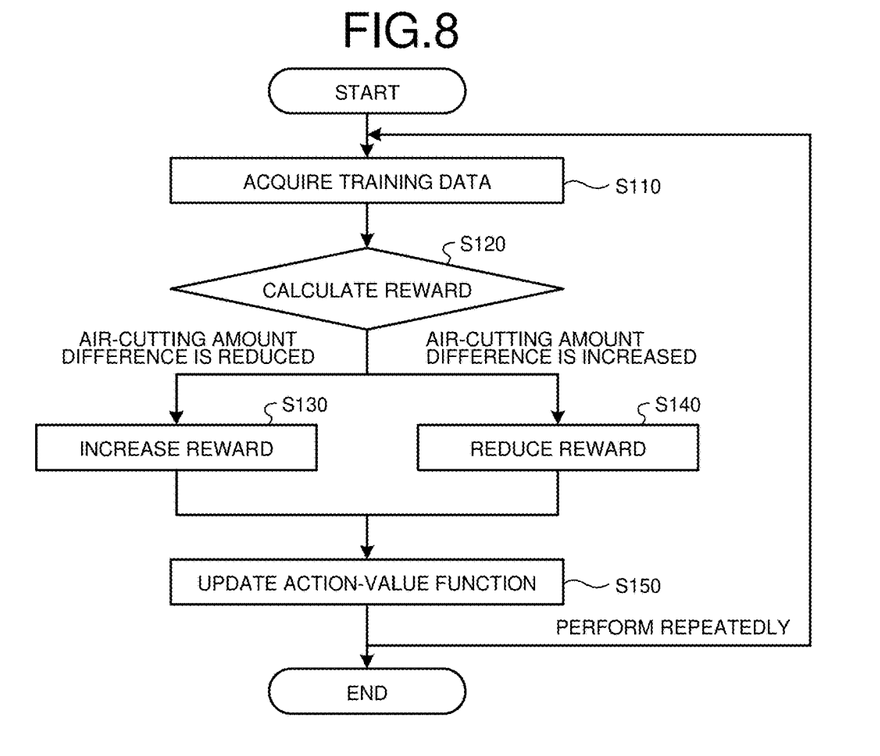
FIG. 8 is a flowchart illustrating a processing procedure for learning processing by the learning apparatus according to the embodiment.

Next, processing by the learning apparatus to learn the post-adjustment parameter H6 will be described with reference to FIG. 8. FIG. 8 is a flowchart illustrating a processing procedure for learning processing by the learning apparatus according to the embodiment.

The data acquisition unit 61 acquires the post-adjustment parameter H6, the specified air-cutting amount H2, and the estimated air-cutting amount H9 as training data (step S110).

The model generation unit 62 calculates a reward based on the specified air-cutting amount H2 and the estimated air-cutting amount H9 (step S120). Specifically, the reward calculation unit 620 of the model generation unit 62 acquires the specified air-cutting amount H2 and the estimated air-cutting amount H9, and determines whether to increase the reward or reduce the reward based on a predetermined reward criterion (an increase or a decrease in the air-cutting amount difference).

When the reward calculation unit 620 determines that the reward will be increased (step S120, the air-cutting amount difference is reduced), the reward calculation unit 620 increases the reward (step S130). That is, the reward calculation unit 620 increases the reward when a reward increase criterion is satisfied due to a decrease in the air-cutting amount difference.

On the other hand, when the reward calculation unit 620 determines that the reward will be reduced (step S120, the air-cutting amount difference is increased), the reward calculation unit 620 reduces the reward (step S140). That is, the reward calculation unit 620 reduces the reward when a reward decrease criterion is satisfied due to an increase in the air-cutting amount difference.

The function update unit 621 updates the action-value function $Q(s_t, a_t)$ represented by formula (1) stored in the learned model storage unit 80, based on the reward calculated by the reward calculation unit 620 (step S150).

The learning apparatus 60 repeatedly performs the above steps in steps S110 to S150 and stores the generated action-value function $Q(s_t, a_t)$ as the learned model in the learned model storage unit 80.

<Use Phase>

Figure 9:
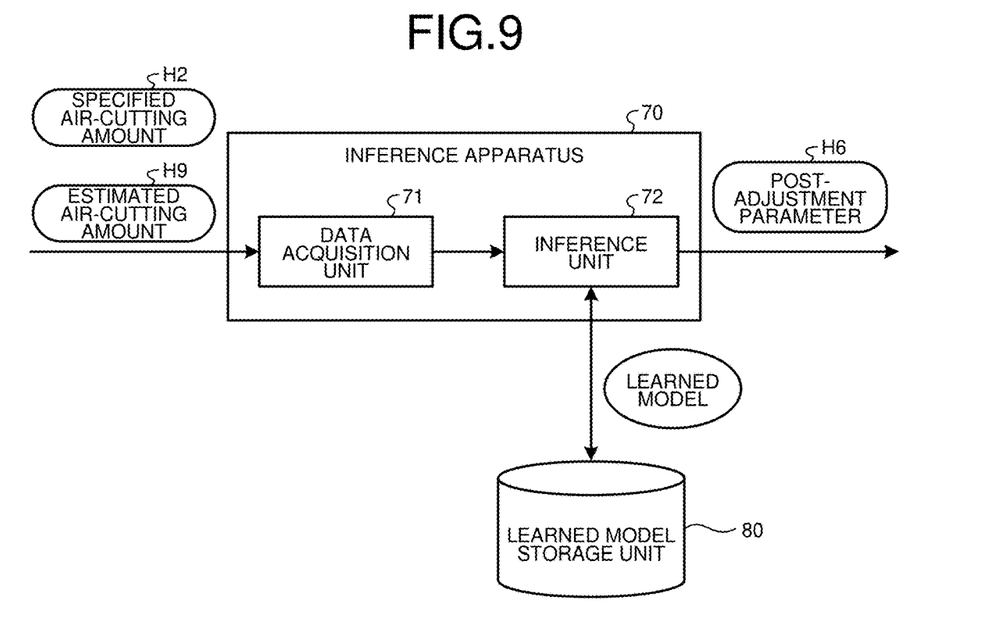
FIG. 9 is a diagram illustrating a configuration of an inference apparatus included in the numerical control device according to the embodiment.

FIG. 9 is a diagram illustrating a configuration of the inference apparatus included in the numerical control device according to the embodiment. The inference apparatus 70 includes a data acquisition unit 71 and an inference unit 72. The data acquisition unit 71 acquires the specified air-cutting amount H2 and the estimated air-cutting amount H9.

The data acquisition unit 71 acquires the specified air-cutting amount H2 from the analysis unit 20. The data acquisition unit 71 may acquire the estimated air-cutting amount H9 from the monitoring unit 63 of the learning apparatus 60 or may calculate the estimated air-cutting amount H9 by itself. When the data acquisition unit 71 calculates the estimated air-cutting amount H9, the inference apparatus 70 includes a monitoring unit like the monitoring unit 63. The data acquisition unit 71 may calculate the estimated air-cutting amount H9 by processing like that by the monitoring unit 63. When the data acquisition unit 71 calculates the estimated air-cutting amount H9 by processing like that by the monitoring unit 63, the data acquisition unit 71 estimates the estimated air-cutting amount H9 based on the FB position H3, the cutting load amount H4, and the combined position command H8.

The inference unit 72 infers the post-adjustment parameter H6, using the learned model stored in the learned model storage unit 80. Specifically, by inputting the specified air-cutting amount H2 and the estimated air-cutting amount H9 acquired by the data acquisition unit 71 to the learned model, the inference unit 72 can infer the post-adjustment parameter H6 suitable for the specified air-cutting amount H2 and the estimated air-cutting amount H9. The inference unit 72 sends the inferred post-adjustment parameter H6 to the vibration waveform generation unit 12. Consequently, vibration cutting using the post-adjustment parameter H6 is performed.

The present embodiment has described the inference apparatus 70 that outputs the post-adjustment parameter H6 using the learned model learned by the model generation unit 62 of the numerical control device 1. The inference apparatus 70 may acquire a learned model from another numerical control device. In this case, the inference apparatus 70 outputs the post-adjustment parameter H6 based on the learned model acquired from the other numerical control device.

Figure 10:
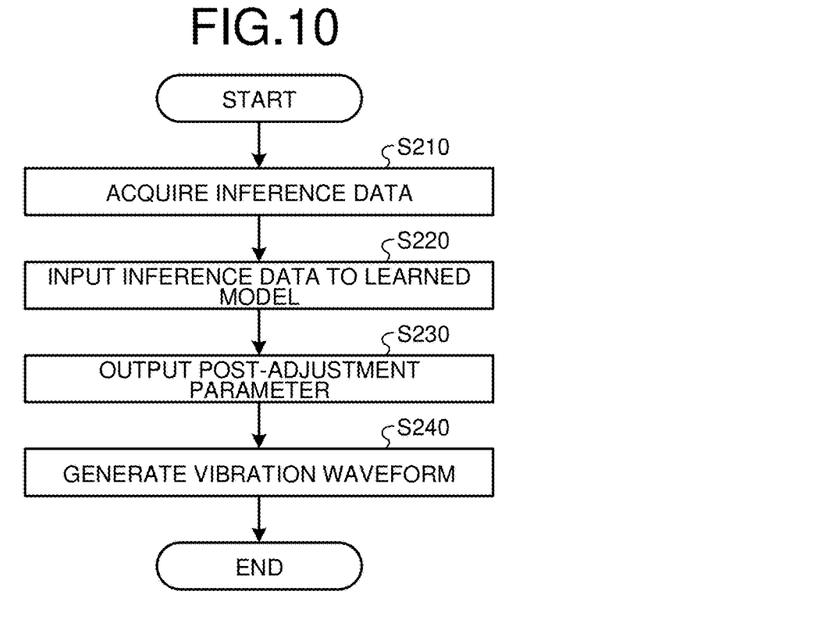
FIG. 10 is a flowchart illustrating a processing procedure for inference processing by the inference apparatus according to the embodiment.

Next, processing by the inference apparatus 70 to infer the post-adjustment parameter H6 will be described with reference to FIG. 10. FIG. 10 is a flowchart illustrating a processing procedure for inference processing by the inference apparatus according to the embodiment.

The data acquisition unit 71 of the inference apparatus 70 acquires the specified air-cutting amount H2 and the estimated air-cutting amount H9 as inference data (step S210).

The inference unit 72 inputs the specified air-cutting amount H2 and the estimated air-cutting amount H9 as the inference data to the learned model stored in the learned model storage unit 80 (step S220), to obtain the post-adjustment parameter H6 corresponding to the input information. The inference unit 72 outputs the obtained post-adjustment parameter H6 to the controller 10 via the parameter adjustment unit 40 (step S230).

The vibration waveform generation unit 12 of the controller 10 generates the vibration waveform H7, using the post-adjustment parameter H6 output from the inference unit 72 (step S240). Thus, when the specified air-cutting amount H2 is set, the numerical control device 1 adjusts the post-adjustment parameter H6 so that the estimated air-cutting amount H9 becomes the specified air-cutting amount H2, to perform vibration cutting. When the specified air-cutting amount H2 is not set, the numerical control device 1 adjusts the post-adjustment parameter H6 (such as the vibration amplitude-feed ratio Q1) so that the estimated air-cutting amount H9 becomes a minimum air-cutting amount greater than zero, to perform vibration cutting. In other words, the numerical control device 1 calculates the post-adjustment parameter H6 to produce a minimum air-cutting amount, and controls vibration cutting with this post-adjustment parameter H6.

The minimum air-cutting amount that is not zero is the smallest air-cutting amount of air-cutting amounts that allow chips to fall off. The numerical control device 1 sets in advance air-cutting amounts that allow chips to fall off, based on the previous cutting load amounts H4 during vibration cutting.

The model generation unit 62 may use, as the learning algorithm, deep learning to learn extraction of features themselves. The model generation unit 62 may perform machine learning according to another known method such as a neural network, genetic programming, functional logic programming, or a support vector machine.

The learning apparatus 60 and the inference apparatus 70 may be, for example, apparatuses separate from the numerical control device 1 and connected to the numerical control device 1 via a network. Further, the learning apparatus 60 and the inference apparatus 70 may be incorporated in the numerical control device 1.

Furthermore, the learning apparatus 60 and the inference apparatus 70 may be present on a cloud server.

The model generation unit 62 may learn the post-adjustment parameter H6, using training data acquired from a plurality of the numerical control devices 1. The model generation unit 62 may acquire training data from a plurality of the numerical control devices 1 used in the same area, or may learn the post-adjustment parameter H6 using training data collected from a plurality of the numerical control devices 1 operating independently in different areas. A numerical control device 1 from which to collect training data may be added to objects or removed from objects in the middle. Furthermore, the learning apparatus 60 that has learned the post-adjustment parameter H6 on a certain numerical control device 1 may be applied to another numerical control device 1, and the post-adjustment parameter H6 may be relearned on the other numerical control device 1, to be updated.

As described above, the numerical control device 1 of the embodiment learns and outputs the post-adjustment parameter H6 so that the estimated air-cutting amount H9 approaches the specified air-cutting amount H2 set by the user.

Figure 11:
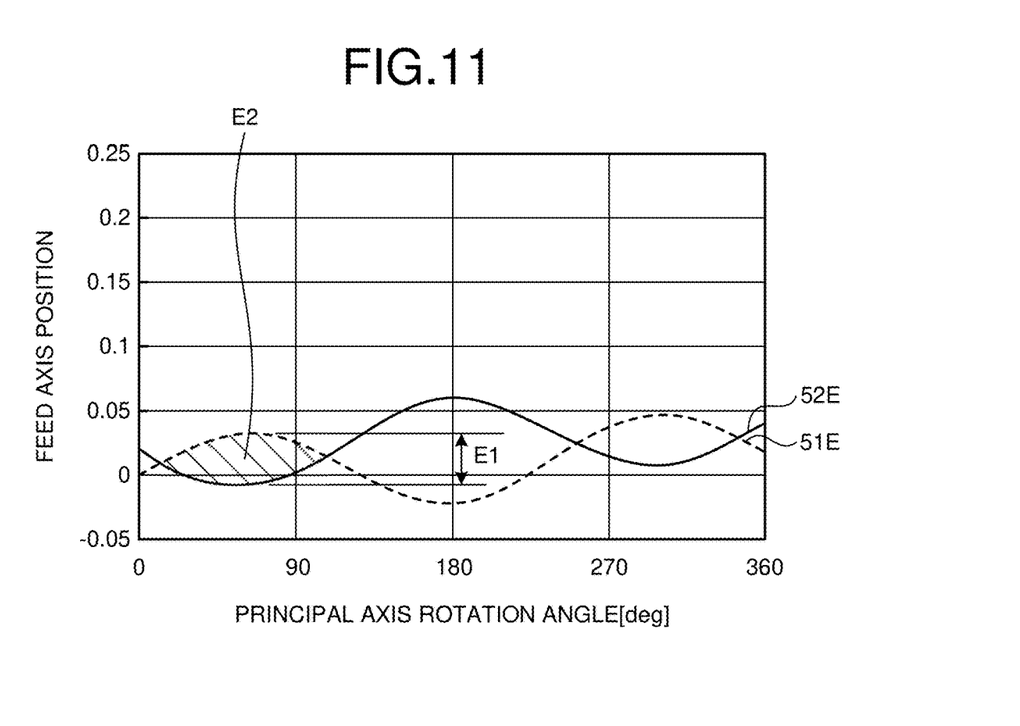
FIG. 11 is a diagram for explaining an estimated air-cutting amount and a specified air-cutting amount when a post-adjustment parameter inferred by the inference apparatus according to the embodiment is used in vibration cutting.

FIG. 11 is a diagram for explaining the estimated air-cutting amount and the specified air-cutting amount when the post-adjustment parameter inferred by the inference apparatus according to the embodiment is used in vibration cutting. In a graph illustrated in FIG. 11, the horizontal axis represents the principal axis rotation angle, and the vertical axis represents the feed axis position. FIG. 11 illustrates the feed axis position with respect to the principal axis rotation angle.

A waveform 51E is a waveform indicating the feed axis position of the tool in the first rotation of the workpiece. A waveform 52E is a waveform indicating the feed axis position of the tool in the second rotation of the workpiece. Zones below the waveform 51E and above the waveform 52E are air-cutting zones E2. In FIG. 11, the estimated air-cutting amount H9 is indicated by an air-cutting amount E1.

When the user sets the air-cutting amount (specified air-cutting amount H2) corresponding to the air-cutting zones E2, the numerical control device 1 adjusts the post-adjustment parameter H6 so that the estimated air-cutting amount H9 (air-cutting amount E1) becomes equal to the specified air-cutting amount H2. Consequently, the estimated air-cutting amount H9 becomes equal to the specified air-cutting amount H2.

When vibration cutting is performed, a following delay of the servomotor may occur, or air-cutting zones may be small. In such a case, if the post-adjustment parameter H6 is not adjusted unlike in the numerical control device 1 of the present embodiment, chips may not fall off. Even when chips do not fall off, the numerical control device 1 of the present embodiment, which, by contrast, adjusts the post-adjustment parameter H6 based on the cutting load amount H4, thus allows chips to fall off by adjusting the post-adjustment parameter H6.

Figure 12:
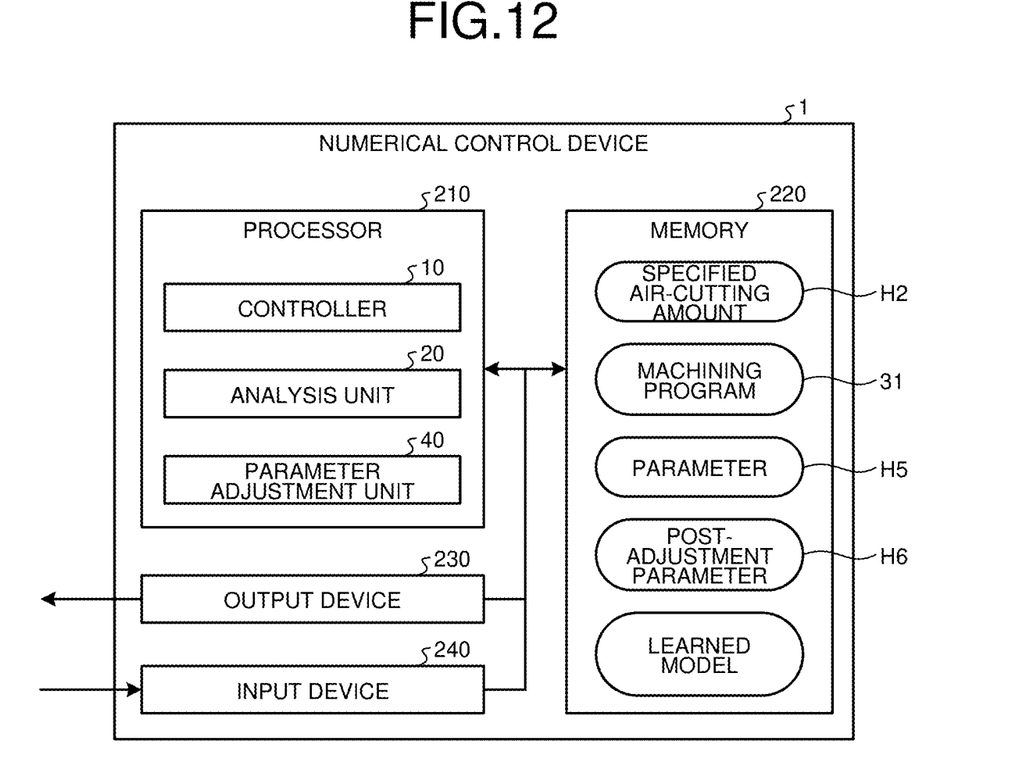
FIG. 12 is a diagram illustrating an example of a hardware configuration for implementing the numerical control device according to the embodiment.

Here, a hardware configuration of the numerical control device 1 will be described. FIG. 12 is a diagram illustrating an example of a hardware configuration for implementing the numerical control device according to the embodiment.

The numerical control device 1 can be implemented by an input device 240, a processor 210, memory 220, and an output device 230. An example of the processor 210 is a central processing unit (CPU, also called a central processor, a processing unit, an arithmetic unit, a microprocessor, a microcomputer, or a digital signal processor (DSP)), or a system large-scale integration (LSI). Examples of the memory 220 are random-access memory (RAM) and read-only memory (ROM).

The numerical control device 1 is implemented by the processor 210 reading and executing the computer-executable machining program 31 to implement the operation of the numerical control device 1 stored in the memory 220. The machining program 31, which is a program to implement the operation of the numerical control device 1, can be said to cause a computer to perform the procedures or the methods in the numerical control device 1.

The machining program 31 executed by the numerical control device 1 has a module configuration including the controller 10, the analysis unit 20, and the parameter adjustment unit 40, which are loaded on the main memory and generated on the main memory.

The input device 240 receives the specified air-cutting amount H2, the parameter H5, and the machining program 31 from the user or an external device, and sends them to the memory 220.

The memory 220 corresponds to the storage unit 30 and the learned model storage unit 80. The memory 220 stores the learned model, the specified air-cutting amount H2, the parameter H5, the post-adjustment parameter H6, the machining program 31, etc. The learned model, the specified air-cutting amount H2, the parameter H5, the post-adjustment parameter H6, and the machining program 31 are sent to the processor 210. The memory 220 is also used as temporary memory when the processor 210 performs various types of processing. The output device 230 sends the combined position command H8 to the power unit 3.

The machining program 31 may be stored on a computer-readable storage medium in an installable-format or executable-format file and provided as a computer program product. The machining program 31 may be provided to the numerical control device 1 via a network such as the Internet. The functions of the numerical control device 1 may be partly implemented by dedicated hardware such as a dedicated circuit and partly implemented by software or firmware. Each of the numerical control device 1, the learning apparatus 60, and the inference apparatus 70 may be implemented by a different hardware configuration.

As described above, according to the embodiment, the numerical control device 1 calculates the post-adjustment parameter H6 used in vibration cutting, based on the cutting load amount H4 when the vibration cutting is performed, and controls the vibration cutting using the post-adjustment parameter H6, and thus can continue the control of the vibration cutting without the user performing parameter adjustment.

The numerical control device 1 performs vibration cutting while automatically performing parameter adjustment such that chips are cut off, and thus can prevent the vibration cutting from being continued without chips being cut off. The user only needs to input a vibration cutting command to the numerical control device 1 and does not need to perform parameter adjustment, so that usability is improved.

Even when the tool wears due to continuous operation of the machine tool 2 for a long time, changing air-cutting zones, the numerical control device 1 can control vibration cutting without the user performing parameter adjustment.

Even when the tool feed rate F is changed, the numerical control device 1 can control vibration cutting without the user performing parameter adjustment.

The configuration described in the above embodiment illustrates an example, and can be combined with another known art, and can be partly omitted or changed without departing from the gist.

REFERENCE SIGNS LIST

1 numerical control device; 2 machine tool; 3 power unit; 10 controller; 11 position command generation unit; 12 vibration waveform generation unit; 13 adder; 20 analysis unit; 30 storage unit; 31 machining program; 32 parameter storage area; 40 parameter adjustment unit; 51A, 52A, 51B, 52B, 51C, 52C, 51D, 52D, 51E, 52E waveform; 53C, 53D cutting load amount waveform; 60 learning apparatus; 61, 71 data acquisition unit; 62 model generation unit; 63 monitoring unit; 70 inference apparatus; 72 inference unit; 80 learned model storage unit; 100 machining system; 210 processor; 220 memory; 230 output device; 240 input device; 620 reward calculation unit; 621 function update unit; A1, D1, E1 air-cutting amount; A2, B2, D2, E2 air-cutting zone; A3, B3 amplitude amount; D4 air-cutting period; H1 position command; H2 specified air-cutting amount; H3 FB position; H4 cutting load amount; H5 parameter; H6 post-adjustment parameter; H7 vibration waveform; H8 combined position command; H9 estimated air-cutting amount.

The invention claimed is:

1. A numerical control device to machine a workpiece while performing vibration cutting in which a tool and the workpiece are relatively vibrated by driving a first axis to drive the tool or a second axis to drive the workpiece, the device comprising:
    parameter adjustment circuitry to adjust a parameter related to a vibration condition for the vibration cutting during the vibration cutting, based on an amount of cutting load that is generated on the first axis or the second axis and changes during the vibration cutting; and
    controller circuitry to control the vibration cutting using the adjusted parameter, wherein
    when there is a difference between a specified air-cutting amount that is a command value of an air-cutting amount at a time when the tool cuts air with respect to the workpiece during the vibration cutting, and an estimated air-cutting amount that is an estimated value of the air-cutting amount, the parameter adjustment circuitry calculates the parameter with which the estimated air-cutting amount approaches the specified air-cutting amount.

2. The numerical control device according to claim 1, wherein
    an air-cutting zone at a time when the tool cuts air with respect to the workpiece during the vibration cutting is determined based on an amount of change in the cutting load amount, and the estimated air-cutting amount is estimated by calculating the air-cutting amount in the air-cutting zone.

3. The numerical control device according to claim 2, wherein
    the parameter includes a vibration amplitude-feed ratio that is a ratio between an amplitude amount of vibration of the tool and a rate of feed of the tool in a direction parallel to the second axis.

4. The numerical control device according to claim 1, wherein
    the parameter includes a vibration amplitude-feed ratio that is a ratio between an amplitude amount of vibration of the tool and a rate of feed of the tool in a direction parallel to the second axis.

5. The numerical control device according to claim 1, further comprising:
    a learning apparatus to learn the parameter, wherein
    the learning apparatus includes
        data acquisition circuitry to acquire training data including the estimated air-cutting amount and the parameter associated with the estimated air-cutting amount, and model generation circuitry to generate a learned model for inferring the parameter from the estimated air-cutting amount, using the training data.

6. The numerical control device according to claim 1, further comprising:
an inference apparatus to infer the parameter, wherein the inference apparatus includes
data acquisition circuitry to acquire the estimated air-cutting amount, and
inference circuitry to output the parameter from the estimated air-cutting amount acquired by the data acquisition circuitry, using a learned model for inferring the parameter from the estimated air-cutting amount.

7. A numerical control device to machine a workpiece while performing vibration cutting in which a tool and the workpiece are relatively vibrated by driving a first axis to drive the tool or a second axis to drive the workpiece, the device comprising:
parameter adjustment circuitry to adjust a parameter related to a vibration condition for the vibration cutting during the vibration cutting, based on an amount of cutting load that is generated on the first axis or the second axis—and changes during the vibration cutting; and
controller circuitry to control the vibration cutting using the adjusted parameter, wherein
the parameter adjustment circuitry calculates the parameter with which an estimated value of an air-cutting amount at a time when the tool cuts air with respect to the workpiece during the vibration cutting becomes a minimum air-cutting amount greater than zero.

8. A learning apparatus, comprising:
data acquisition circuitry to acquire training data including an estimated air-cutting amount that is an estimated value of an amount of air-cutting of a tool with respect to a workpiece when vibration cutting on the workpiece is performed with the tool and the workpiece being relatively vibrated by driving a first axis to drive the tool or a second axis to drive the workpiece, and a parameter used in the vibration cutting associated with the estimated air-cutting amount; and
model generation circuitry to generate a learned model for inferring the parameter from the estimated air-cutting amount, using the training data.

9. The learning apparatus according to claim 8, wherein
the data acquisition circuitry acquires the training data including the estimated air-cutting amount, a specified air-cutting amount that is a command value of the air-cutting amount, and the parameter associated with the estimated air-cutting amount and the specified air-cutting amount, and
the model generation circuitry generates the learned model for inferring the parameter from the estimated air-cutting amount and the specified air-cutting amount, using the training data.

10. An inference apparatus, comprising:
data acquisition circuitry to acquire an estimated air-cutting amount that is an estimated value of an amount of air-cutting of a tool with respect to a workpiece when vibration cutting on the workpiece is performed with the tool and the workpiece being relatively vibrated by driving a first axis to drive the tool or a second axis to drive the workpiece; and
inference circuitry to infer a parameter used in the vibration cutting from the estimated air-cutting amount acquired by the data acquisition circuitry, using a learned model for inferring the parameter from the estimated air-cutting amount, and output the inferred parameter.

11. The inference apparatus according to claim 10, wherein
the data acquisition circuitry acquires the estimated air-cutting amount and a specified air-cutting amount that is a command value of the air-cutting amount, and
the inference circuitry infers the parameter from the estimated air-cutting amount and the specified air-cutting amount acquired by the data acquisition circuitry, using the learned model for inferring the parameter from the estimated air-cutting amount and the specified air-cutting amount, and outputs the inferred parameter.

12. A numerical control method to machine a workpiece while performing vibration cutting in which a tool and the workpiece are relatively vibrated by driving a first axis to drive the tool or a second axis to drive the workpiece, the method comprising:
adjusting a parameter related to a vibration condition for the vibration cutting during the vibration cutting, based on an amount of cutting load that is generated on the first axis or the second axis and changes during the vibration cutting; and
controlling the vibration cutting using the adjusted parameter, wherein
in the adjusting, when there is a difference between a specified air-cutting amount that is a command value of an air-cutting amount at a time when the tool cuts air with respect to the workpiece during the vibration cutting, and an estimated air-cutting amount that is an estimated value of the air-cutting amount, the parameter is calculated with which the estimated air-cutting amount approaches the specified air-cutting amount.

13. A numerical control method to machine a workpiece while performing vibration cutting in which a tool and the workpiece are relatively vibrated by driving a first axis to drive the tool or a second axis to drive the workpiece, the method comprising:
adjusting a parameter related to a vibration condition for the vibration cutting during the vibration cutting, based on an amount of cutting load that is generated on the first axis or the second axis and changes during the vibration cutting; and
controlling the vibration cutting using the adjusted parameter, wherein
in the adjusting, the parameter is calculated with which an estimated value of an air-cutting amount at a time when the tool cuts air with respect to the workpiece during the vibration cutting becomes a minimum air-cutting amount greater than zero.

* * * * *